UNITED STATES PATENT OFFICE.

JENNETT COOPER, OF SAN FRANCISCO, CALIFORNIA.

IMPROVEMENT IN MEDICAL COMPOUNDS.

Specification forming part of Letters Patent No. 164,674, dated June 22, 1875; application filed September 30, 1874.

*To all whom it may concern:*

Be it known that I, JENNETT COOPER, of San Francisco city and county, State of California, have invented an Improved Medical Compound, of which the following is a specification:

My invention relates to a new medical compound for the treatment of coughs, colds, all diseases of the nasal organs, throat, and lungs, liver complaint, venereal diseases, consumption, rheumatism, dyspepsia, and various other diseases.

To make my medical compound, I take the leaves of the bush which is known upon the Pacific coast as yerba santa, (*Eriodyction glutinosum*.) These leaves I place in alcohol, which has previously been diluted with water to about half its ordinary strength, and boil them for a few minutes over a fire. I then strain off the alcoholic extract thus obtained. Before treatment I prefer to cut up or macerate the leaves, so that they will more readily part with their medicinal properties. I then take the bud or flower of the plant *Grindelia robusta*, and after macerating them I make an alcoholic extract similar to that above described for the yerba santa, (*Eriodyction glutinosum*.) I then mix equal proportions of these extracts together, and bottle for use; or they may be distilled before or after mixing.

This compound is quite pleasant to the taste, and can be taken several times a day. About one tea-spoonful forms a single dose.

Having thus described my invention, what I claim, and desire to secure by Letters Patent, is—

A medical compound consisting of an extract from the leaves of the yerba santa, procured by boiling them in diluted alcohol, and an alcoholic extract from the buds or flowers of the *Grindelia robusta*, mixed in equal proportions, substantially as and for the purpose set forth.

In witness whereof I hereunto set my hand and seal.

JENNETT COOPER. [L. S.]

Witnesses:
 C. E. BUCKINGHAM,
 E. H. THARP.